United States Patent
Suzuki

(10) Patent No.: US 9,210,732 B2
(45) Date of Patent: Dec. 8, 2015

(54) WIRELESS COMMUNICATION DEVICE REGISTRATION IN A WIRELESS NETWORK

(75) Inventor: Takanobu Suzuki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 276 days.

(21) Appl. No.: 13/588,336

(22) Filed: Aug. 17, 2012

(65) Prior Publication Data

US 2013/0044635 A1     Feb. 21, 2013

(30) Foreign Application Priority Data

Aug. 17, 2011   (JP) ................................ 2011-178590

(51) Int. Cl.
   *H04L 12/28*   (2006.01)
   *H04W 76/02*   (2009.01)
   *H04J 1/16*    (2006.01)
   *H04W 8/00*    (2009.01)

(52) U.S. Cl.
   CPC ............ *H04W 76/023* (2013.01); *H04W 8/005* (2013.01)

(58) Field of Classification Search
   CPC ........................... H04W 76/023; H04W 8/005
   USPC .................................. 370/252, 230, 329, 386
   See application file for complete search history.

(56) References Cited

U.S. PATENT DOCUMENTS

| 8,560,646 B1* | 10/2013 | Sivasubramanian et al. ........... H04L 45/64 705/7.32 |
| 2012/0243524 A1* | 9/2012 | Verma et al. .................. 370/338 |
| 2012/0265913 A1* | 10/2012 | Suumaki et al. .............. 710/303 |
| 2013/0132854 A1* | 5/2013 | Raleigh et al. ........ G06F 3/0482 715/738 |

FOREIGN PATENT DOCUMENTS

| JP | 2001320373 A | 11/2001 |
| JP | 2009089230 A | 4/2009 |

OTHER PUBLICATIONS

"Wi-Fi Peer-to-Peer (P2P) Technical Specification, Version 1.1", Wi-Fi Alliance Technical Committee P2P Task Group, 2010, 159 pages.

* cited by examiner

*Primary Examiner* — John Pezzlo
(74) *Attorney, Agent, or Firm* — Banner & Witcoff, Ltd.

(57) ABSTRACT

A wireless communication device receives a first-type packet. If the first-type packet does not include first predetermined information, the device may store first specific information. In some examples, if the first-type packet includes the first predetermined information, the device does not store the first specific information. The device receives a second-type packet after receiving the first-type packet. If the first specific information is stored and the second-type packet is received, the device may send a third-type packet when the target-device identifying information is the same as the first-external-device identifying information. The third-type packet might not be sent where the target-device identifying information is different from the first-external-device identifying information. If the first specific information is not stored and the second-type packet is received, the device may send the third-type packet. When sending the third-type packet, the device may also send a wireless profile.

18 Claims, 10 Drawing Sheets

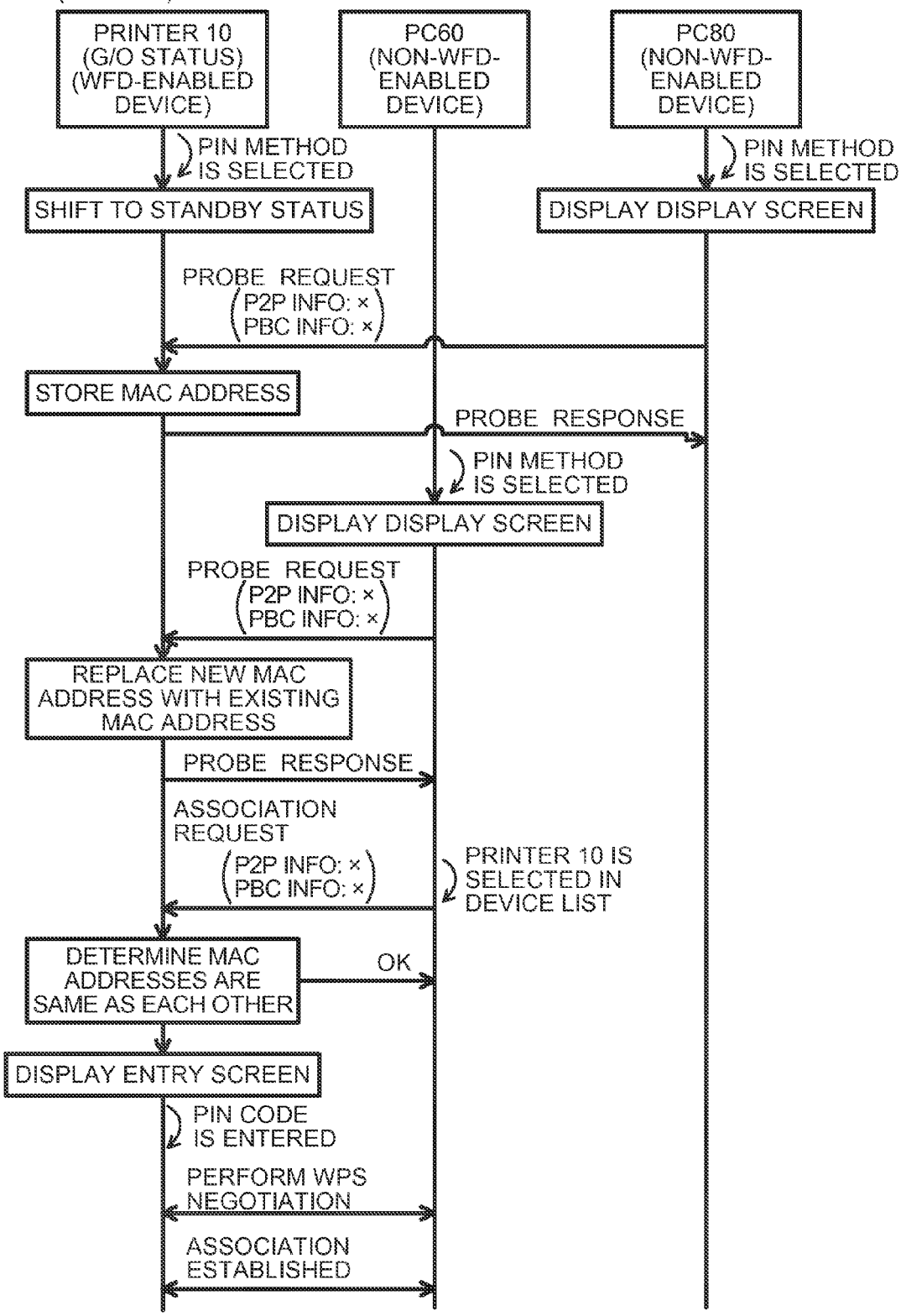

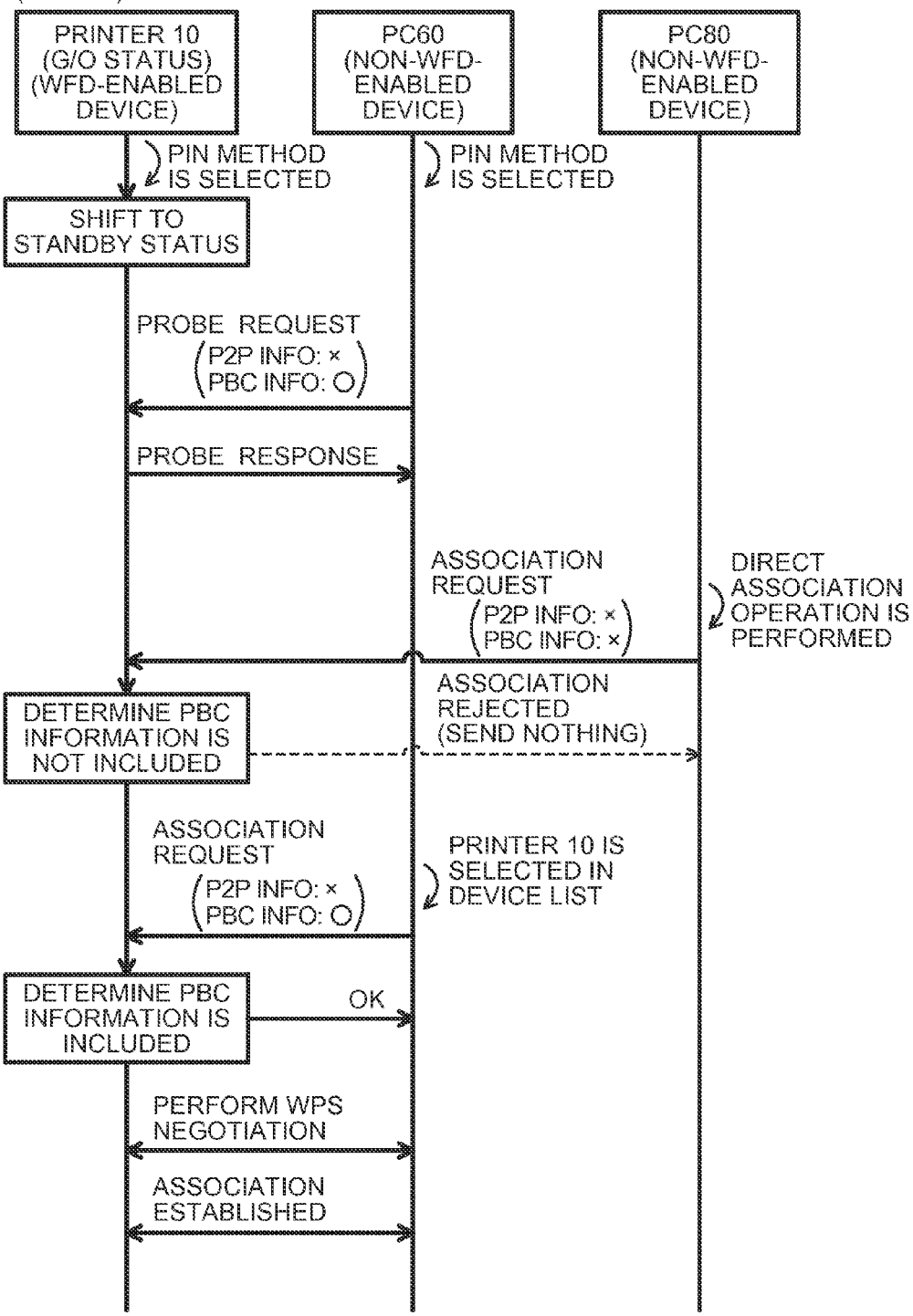

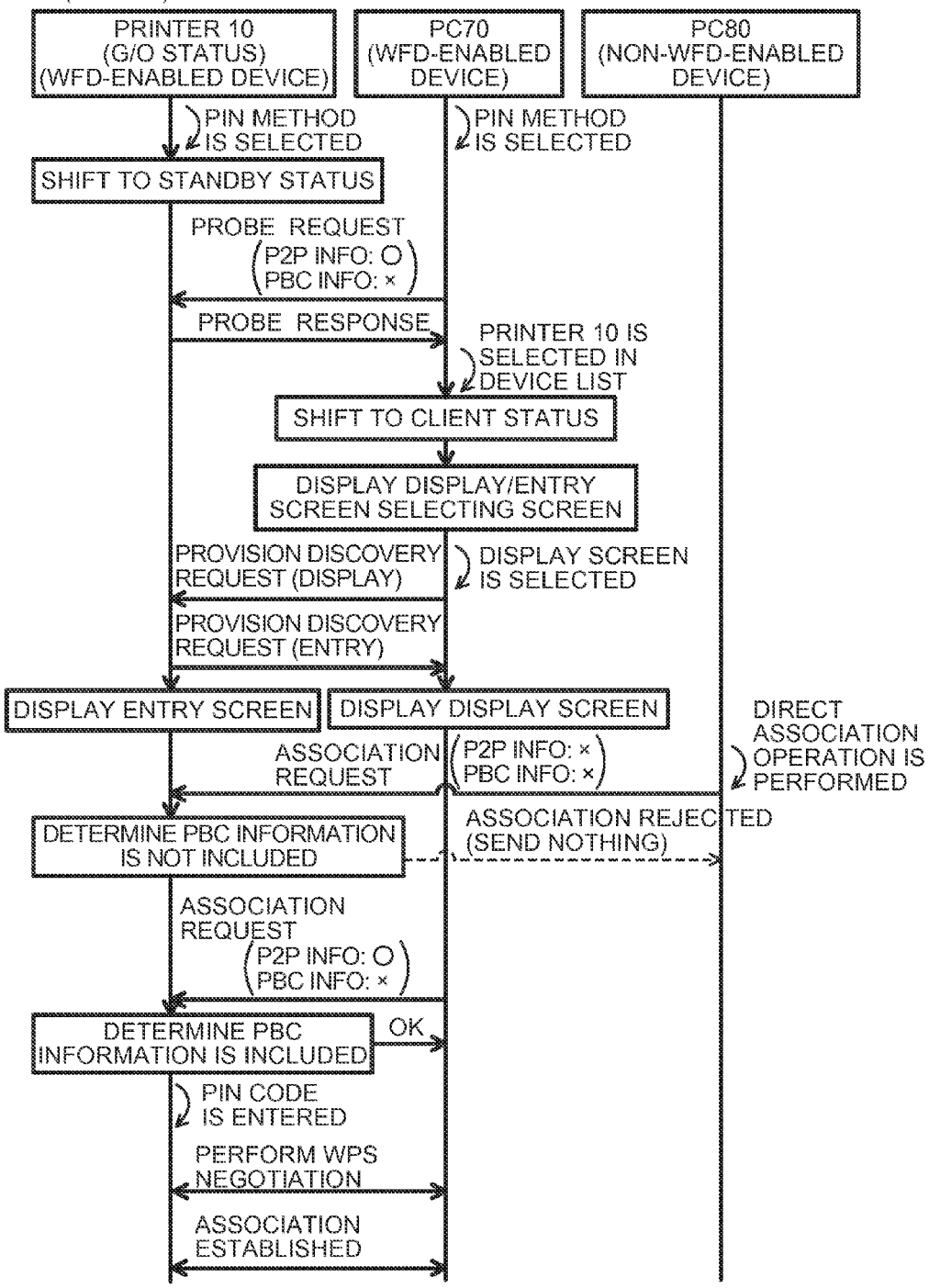

WIRELESS COMMUNICATION DEVICE REGISTRATION IN A WIRELESS NETWORK

CROSS-REFERENCE TO RELATED APPLICATION

This application claims priority from Japanese Patent Application No. 2011-178590, filed on Aug. 17, 2011, which is incorporated herein by reference.

TECHNICAL FIELD

Aspects of the disclosure relate to a wireless communication device that serves as a master station in a wireless network.

BACKGROUND

In a known technique, a client device establishes a wireless connection with an access point ("AP") by using one of the PIN (an abbreviation for "Personal Identification Number") Method and the PBC (an abbreviation for "Push-Button-Configuration") Method of the Wi-Fi Protected Setup ("WPS") created by the Wi-Fi Alliance.

SUMMARY

An embodiment provides for a technique for allowing a target device to serve as a slave station in a wireless network in an appropriate manner.

According to one or more aspects of the disclosure, a wireless communication device may serve as a master station in a wireless network. The wireless communication device may comprise a processor and a memory storing computer-readable instructions therein. The computer-readable instructions, when executed, may instruct or otherwise cause the wireless communication device (e.g., various components thereof) to perform several functions. In one example, the computer-readable instructions may instruct the wireless communication device to perform a function of receiving a first-type packet from a target device (e.g., a device that is to serve as a slave station in the wireless network), the first-type packet comprising information for identifying the target device. The computer-readable instructions may further instruct the wireless communication device to perform a function of storing first specific information in the memory when the first-type packet received from the target device does not include first predetermined information. Moreover, the computer-readable instructions may instruct the wireless communication device to perform a function of not storing the first specific information in the memory when the first-type packet received from the target device includes the first predetermined information. Still further, the computer-readable instructions may instruct the wireless communication device to perform a function of receiving a second-type packet from a first external device after receiving the first-type packet. In one or more examples, the second-type packet may comprise first-external-device identifying information for identifying the first external device. The computer-readable instructions may instruct the wireless communication device to perform a function of sending a third-type packet to the first external device if the target-device identifying information included in the first specific information is the same as the first-external-device identifying information. According to one or more arrangements, the third-type packet may indicate that the first external device is allowed to serve as a slave station in the wireless network. The computer-readable instructions may instruct the wireless communication device to perform a function of not sending the third-type packet to the first external device if the target-device identifying information included in the first specific information is different from the first-external-device identifying information. Additionally or alternatively, the computer-readable instructions may instruct the wireless communication device to perform a function of sending the third-type packet to the first external device that is the same device as the target device when not storing the first specific information in the memory and receiving the second-type packet from the first external device. In some examples, the computer-readable instructions may further instruct the wireless communication device to perform a function of sending the first external device a wireless profile when sending the third-type packet to the first external device.

Other objects, features, and advantages will be apparent to persons of ordinary skill in the art from the following detailed description of the disclosure and the accompanying drawings.

DESCRIPTION OF THE DRAWINGS

For a more complete understanding of the present disclosure, needs satisfied thereby, and the objects, features, and advantages thereof, reference now is made to the following descriptions taken in connection with the accompanying drawing.

FIG. 8 is a sequence diagram depicting operations performed by each device (case A2) in the embodiment according to one or more aspects of the disclosure.

FIG. 9 is a sequence diagram depicting operations performed by each device (case B) in the embodiment according to one or more aspects of the disclosure.

FIG. 10 is a sequence diagram depicting operations performed by each device (case C) in the embodiment according to one or more aspects of the disclosure.

DETAILED DESCRIPTION OF EMBODIMENT

Figure 1:
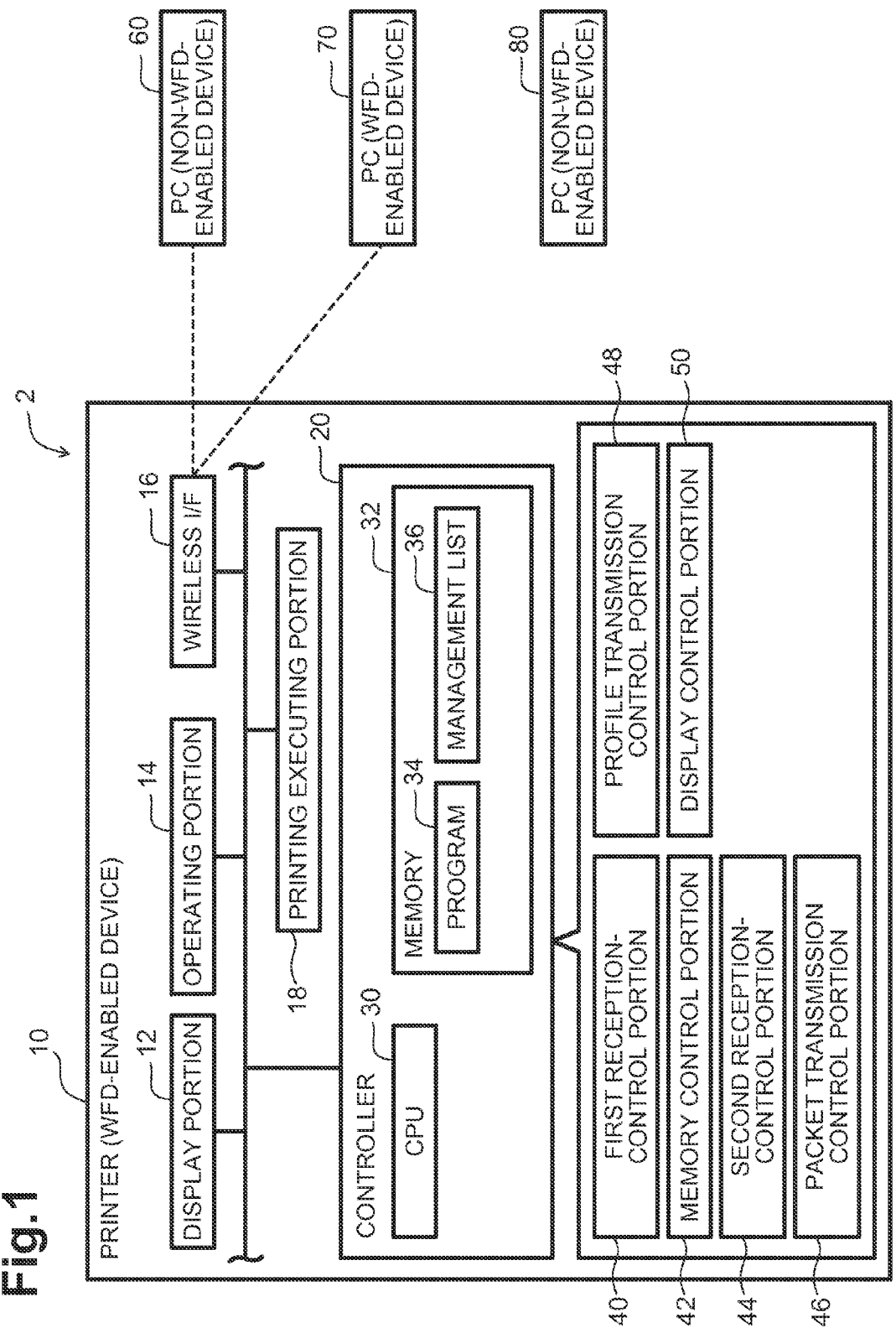
FIG. 1 depicts a configuration of a communication system in an example embodiment according to one or more aspects of the disclosure.

As depicted in FIG. 1, a communication system 2 may comprise a printer 10 (which may be a peripheral device for personal computers ("PCs") 60, 70, 80) and PCs 60, 70, 80. The printer 10 (e.g., wireless communication device) and the PC 70 may be allowed to perform a wireless communication function in accordance with Wi-Fi Direct (described later). Hereinafter, Wi-Fi Direct may be referred to as "WFD", and the wireless communication function performed in accordance with WFD may be referred to as a "WFD function". The printer 10 and the PC 70 may be allowed to establish a wireless connection therebetween in accordance with WFD. A wireless network may be configured by the establishment of the wireless connection between the printer 10 and the PC 70. Thus, wireless communication, for example, transmission or reception of communication target data, e.g., print data, may become available between the printer 10 and the PC 70. Hereinafter, a device that may support the WFD function, such as the printer 10 and the PC 70, may be referred to as a "WFD-enabled device".

In some arrangements, the PCs 60, 80 may be configured such that they are not able to perform the WFD function. However, the PCs 60, 80 may be configured to perform a common wireless communication function. For example, the PCs 60, 80 may be allowed to establish wireless connections with a known AP. Although described in detail later, a wireless network may be configured by the establishment of the wireless connection between the printer 10, which may function as an AP and operate in a group owner ("G/O") status, and one of the PCs 60, 80. With the configuration of the wireless network, wireless communication, for example, transmission or reception of communication target data, e.g., print data, may become available between the printer 10 and one of the PCs 60, 80. Hereinafter, a device that may not support the WFD function, such as the PCs 60, 80, may be referred to as a "non-WFD-enabled device".

According to some examples, the printer 10 may comprise a display portion 12, an operating portion 14, a wireless interface ("I/F") 16, a printing executing portion 18, and a controller 20, each of which may be connected with a bus (from which a reference numeral is omitted). In one example, the display portion 12 may be a display configured to display various information thereon while the operating portion 14 may comprise a plurality of keys or buttons. A user may be allowed to provide the printer 10 with various instructions by operating the operating portion 14. The wireless interface 16 may be configured to allow the printer 10 to perform wireless communication. The printing executing portion 18 may comprise a printing mechanism of one of an inkjet type and an electrophotographic type. The printing executing portion 18 may perform printing in accordance with an instruction from the controller 20.

The controller 20 may comprise a central processing unit ("CPU") 30 and a memory 32. The memory 32 may be configured to store a program 34 therein. The CPU 30 may perform various processing in accordance with the program 34 and/or one or more instructions thereof. The memory 32 may comprise a read-only memory ("ROM"), a random-access memory ("RAM"), and a hard disk, for example. The memory 32 may be configured to store a management list 36 (described later) as well as the program 34. Each function of a first reception-control portion 40, a memory control portion 42, a second reception-control portion 44, a packet transmission control portion 46, a profile transmission control portion 48, and a display control portion 50 may be implemented by the CPU 30 to perform processing in accordance with the program 34.

The PC 60 may comprise, for example, a CPU, a memory, and a display, which are not depicted. The memory of the PC 60 may be configured to store a printer driver program or one or more instructions thereof for the printer 10. The CPU of the PC 60 may be configured to generate print data of a print target by using the printer driver program. While a wireless connection is established between the printer 10 and the PC 60, the PC 60 may be able to wirelessly transmit the print data to the printer 10. The PC 70 may have the same configuration as the PC 60 except that the PC 70 may support the WFD function. The PC 80 may have the same configuration as the PC 60.

As described above, the printer 10 and the PC 70 may each be configured to be able to perform the WFD function. The WFD is a standard created by the Wi-Fi Alliance and is specified in the Wi-Fi Peer-to-Peer (P2P) Technical Specification v1.1 drafted by the Wi-Fi Alliance.

The WFD defines three statuses of the WFD-enabled device: a G/O status, a client status, and a device status. The WFD-enabled device (in some examples, the printer 10 and the PC 70) may be configured to operate selectively in one of the three statuses. The non-WFD-enabled device (that is, the PCs 60, 80) may be configured to operate in the client status only.

A single wireless network may be configured by a device in the G/O status (hereinafter, also referred to as a "G/O-status device") and one or more devices in the client status (hereinafter, also referred to as a "client-status device"). In a single wireless network, one or more client-status devices may be present while only one G/O-status device may be present. The G/O-status device may be configured to control the one or more client-status devices. More specifically, the G/O-status device may be configured to store a management list (see the management list 36 in FIG. 1) that may describe identifying information (e.g., a media access control ("MAC") address) of the one or more client-status devices. When a new client-status device (which may be one of the WFD-enabled device and the non-WFD-enabled device) participates in the wireless network, the G/O-status device may add identifying information of the new client-status device on the management list. When one of the one or more client-status devices leaves the wireless network, the G/O-status device may erase the identifying information of the departing or departed client-status device.

The G/O-status device may be configured to perform wireless communication of communication target data (for example, data including information of a network layer of the Open System Interconnection ("OSI") reference model (e.g., print data)) with one of the one or more devices that may be listed in the management list such as one of the one or more client-status devices. The G/O-status device may be configured to not perform wireless communication of the communication target data with a client-status device that is not listed in the management list. The G/O-status device, however, may be configured to perform wireless communication of data for participating in the wireless network (for example, data not including the information of the network layer (a Probe Request packet or data of a physical layer of a Probe Response packet) with the unlisted client-status device. For example, the printer 10 having G/O status may be allowed to receive print data via wireless communication from the PC 70 (e.g., the PC 70 having client status) listed in the management list 36 but might not be allowed to receive print data via wireless communication from a PC not listed in the management list 36.

The G/O-status device may be configured to serve as a relay station configured to relay wireless communication between a plurality of the client-status devices that may transmit communication target data (for example, print data) therebetween. For example, when the PC 60 having client status transmits print data via wireless communication to another printer having client status, the PC 60 may transmit the print data via wireless communication to the printer 10 in the G/O status and then the printer 10 may transmit the print data via wireless communication to the other printer. For example, the G/O-status device may be configured to function as the AP in the wireless network.

The WFD-enabled device that may be absent from the wireless network (e.g., a WFD-enabled device not listed in the management list) may be a device having the device status (hereinafter, also referred to as a "device-status device"). The device-status device may be configured to perform wireless communication of the data for participating the wireless network with the G/O-status device but might not be allowed to perform wireless communication of communication target data (for example, print data) with the G/O-status device via the wireless network.

In this illustrative embodiment, a wireless connection method using the WPS may be adopted to establish a wireless connection between a pair of devices. The printer 10 and PCs 60, 70, 80 may be configured to be available to use the wireless connection method using the WPS regardless of whether the printer 10 or the PC 60, 70, 80 is a WFD-enabled device or a non-WFD-enabled device. The wireless connection method using the WPS may comprise the PIN method and/or the PBC method.

Figure 2:
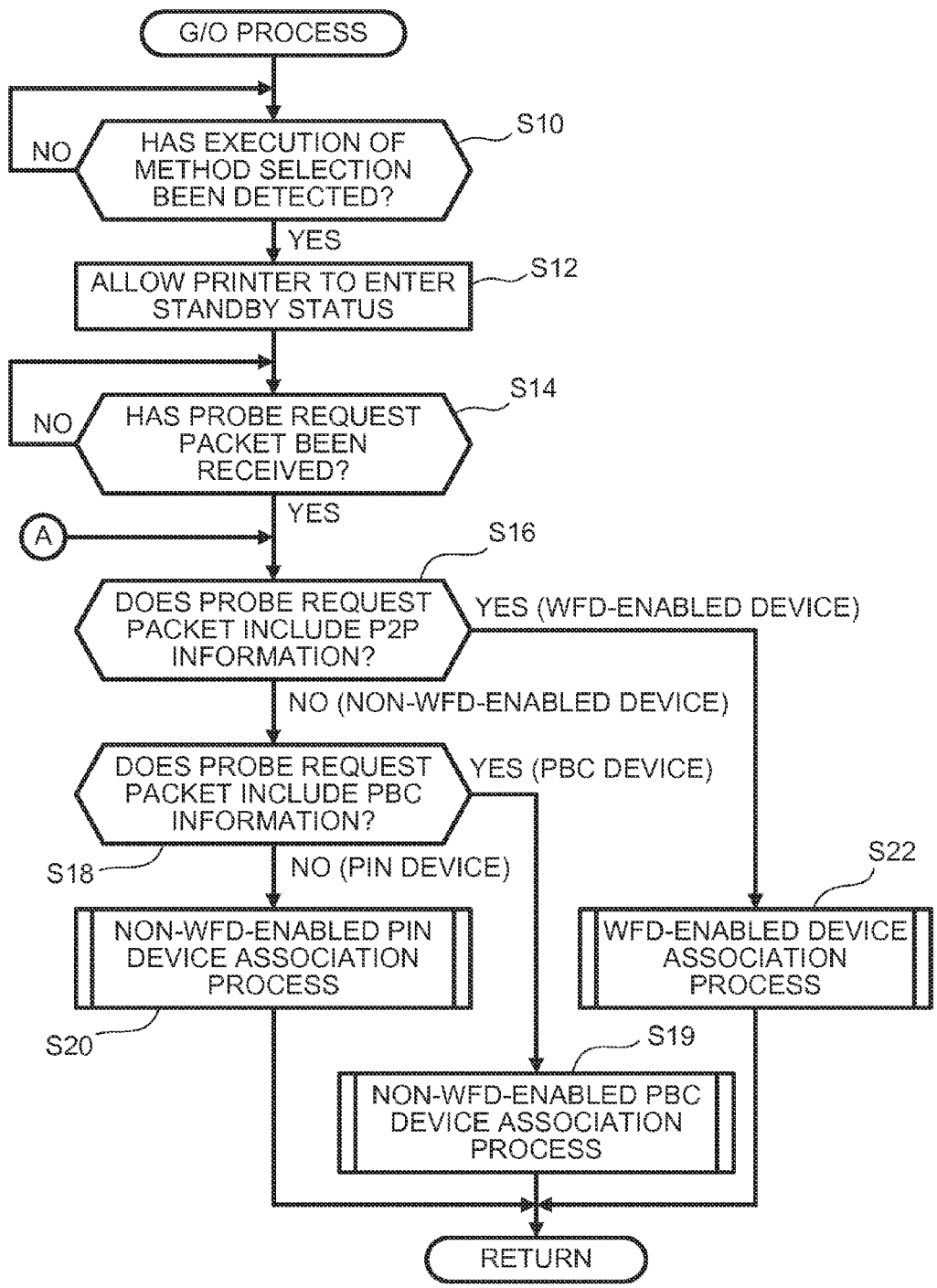
FIG. 2 is a flowchart depicting a G/O process in the embodiment according to one or more aspects of the disclosure.

With reference to FIG. 2, a G/O process performed by the printer 10 in the G/O status is described. The printer 10 may need to be in the G/O status as a precondition for performing the G/O process. In order for the printer 10 to serve as a group owner in the wireless network, an operating status of the printer 10 may need to be changed to the G/O status from another status (e.g., device status or client status) when the wireless network including the printer 10 and another device (hereinafter, referred to as a "specific device") is configured.

For example, when the specific device is a WFD-enabled device, a G/O negotiation may be performed between the printer 10 having the device status and the device-status specific device. In the G/O negotiation, it may be determined which of the printer 10 and the specific device is going to be a group owner. For example, when priorities are assigned to the printer 10 and the specific device, it may be determined that the device having higher priority (for example, the printer 10) may serve as a group owner and the device having lower priority (for example, the specific device) may serve as a client. For another example, a group owner may be determined by lot (e.g., randomly).

When it is determined that the printer 10 is the group owner in the G/O negotiation, the printer 10 may shift to the G/O status from the device status and the specific device may shift to the client status from the device status. In this case, the printer 10 may send a wireless profile (for example, an authentication method and an encryption method) required for the specific device to serve as a client in the wireless network to the specific device. Thus, the printer 10 and the specific device may be allowed to perform wireless communication of the communication target data therebetween by using the same wireless profile (e.g., a wireless network may be configured). When shifting to the G/O status, the printer 10 may enter identifying information of the specific device in the management list 36.

For example, when the specific device is a non-WFD-enabled device, the specific device may be allowed to operate in the client status only. Therefore, the printer 10 in the device status may shift to the G/O status. In this case, the printer 10 may similarly send a wireless profile (for example, an authentication method and an encryption method) to the specific device to configure a wireless network. Further, the printer 10 may enter identifying information of the specific device in the management list 36.

When the user desires that another device participate as a client in the wireless network in which the printer 10 serves as a group owner, the user may operate the operating portion 14 of the printer 10 to perform a method selection for selecting one of the PIN method and the PBC method. Then, the user may also operate an operating portion of the other device to perform a method selection for selecting one of the PIN method and the PBC method. In some cases, the method selected on the other device is the same method as the method selected on the printer 10.

In step S10 of FIG. 2, the controller 20 may supervise an execution of the method selection on the printer 10 by the user. When the controller 20 detects the execution of the method selection, the controller 20 may make a positive determination (YES) in step S10 and the routine may move to step S12.

In step S12, the controller 20 may allow the printer 10 to shift to a standby status. In the standby status, the printer 10 may be allowed to receive a Probe Request packet or an Association Request packet from another device.

In step S14, the first reception-control portion 40 (see FIG. 1) may supervise a receipt of a Probe Request packet. Hereinafter, a source device that may send a Probe Request packet may be referred to as a "target device". For example, when the user operates an operating portion of the first target device (e.g., a device that may need to be participated in the wireless network as a client) to perform the method selection, the first target device may wirelessly send a Probe Request packet to search for the G/O status device (which may serve as an AP) in the wireless network. In this case, the first reception-control portion 40 may wirelessly receive the Probe Request packet from the first target device.

The Probe Request packet may include a MAC address and an information element ("IE"). For example, when the first target device is a WFD-enabled device, the IE may include P2P (Peer-to-Peer) information indicating that the first target device is a WFD-enabled device. In another example, when the first target device is a non-WFD-enabled device, the IE may not include the P2P information. When the PBC method is selected on the first target device, the IE may include PBC information (e.g., first predetermined information) indicating that the first target device may participate in the wireless network in accordance with the PBC method. When the PIN method is selected on the first target device, the IE might not include the PBC information.

When the first reception-control portion 40 makes a positive determination (YES) in step S14 (when a Probe Request packet has been received), the packet transmission control portion 46 (see FIG. 1) may wirelessly send a Probe Response packet to the first target device. The Probe Response packet may include a MAC address of the printer 10 and information indicating that the printer 10 is in the G/O status. Thus, the first target device may find/identify the printer 10 operating in the G/O status (e.g., serving as the AP). After the packet transmission control portion 46 wirelessly sends the Probe Response packet to the first target device, the routine may move to step S16.

In step S16, the memory control portion 42 (see FIG. 1) may determine whether the Probe Request packet received from the first target device includes P2P information (e.g., second predetermined information). When the memory control portion 42 makes a positive determination (YES) in step S16 (when the Probe Request packet includes the P2P information), the routine may move to step S22. For example, when the memory control portion 42 makes the positive determination (YES) in step S16, the first target device may be a WFD-enabled device. In step S22, the controller 20 may perform a WFD-enabled device association process (see FIG. 5).

When the memory control portion 42 makes a negative determination (NO) in step S16 (when the Probe Request packet does not include the P2P information), the routine may move to step S18. For example, when the memory control portion 42 makes the negative determination (NO) in step S16, the first target device may be a non-WFD-enabled device.

In step S18, the memory control portion 42 may determine whether the Probe Request packet received from the first target device includes PBC information. When the memory control portion 42 makes a positive determination (YES) in step S18 (when the Probe Request packet includes the PBC information), the routine may move to step S19. When the memory control portion 42 makes a positive determination (YES) in step S18, the first target device may be a non-WFD-enabled device on which the PBC method has been selected via the operating portion of the first target device. Hereinafter, such a device may be referred to as a "non-WFD-enabled PBC device". In step S19, the controller 20 may perform a non-WFD-enabled PBC device association process (see FIG. 4).

When the memory control portion 42 makes a negative determination (NO) in step S18 (when the Probe Request packet does not include the PBC information), the routine may move to step S20. When the memory control portion 42 makes the negative determination (NO) in step S18, the first target device may be a non-WFD-enabled device on which the PIN method has been selected via the operating portion of the first target device. Hereinafter, such a device may be referred to as a "non-WFD-enabled PIN device". In step S20, the controller 20 may perform a non-WFD-enabled PIN device association process (see FIG. 3).

Figure 3:
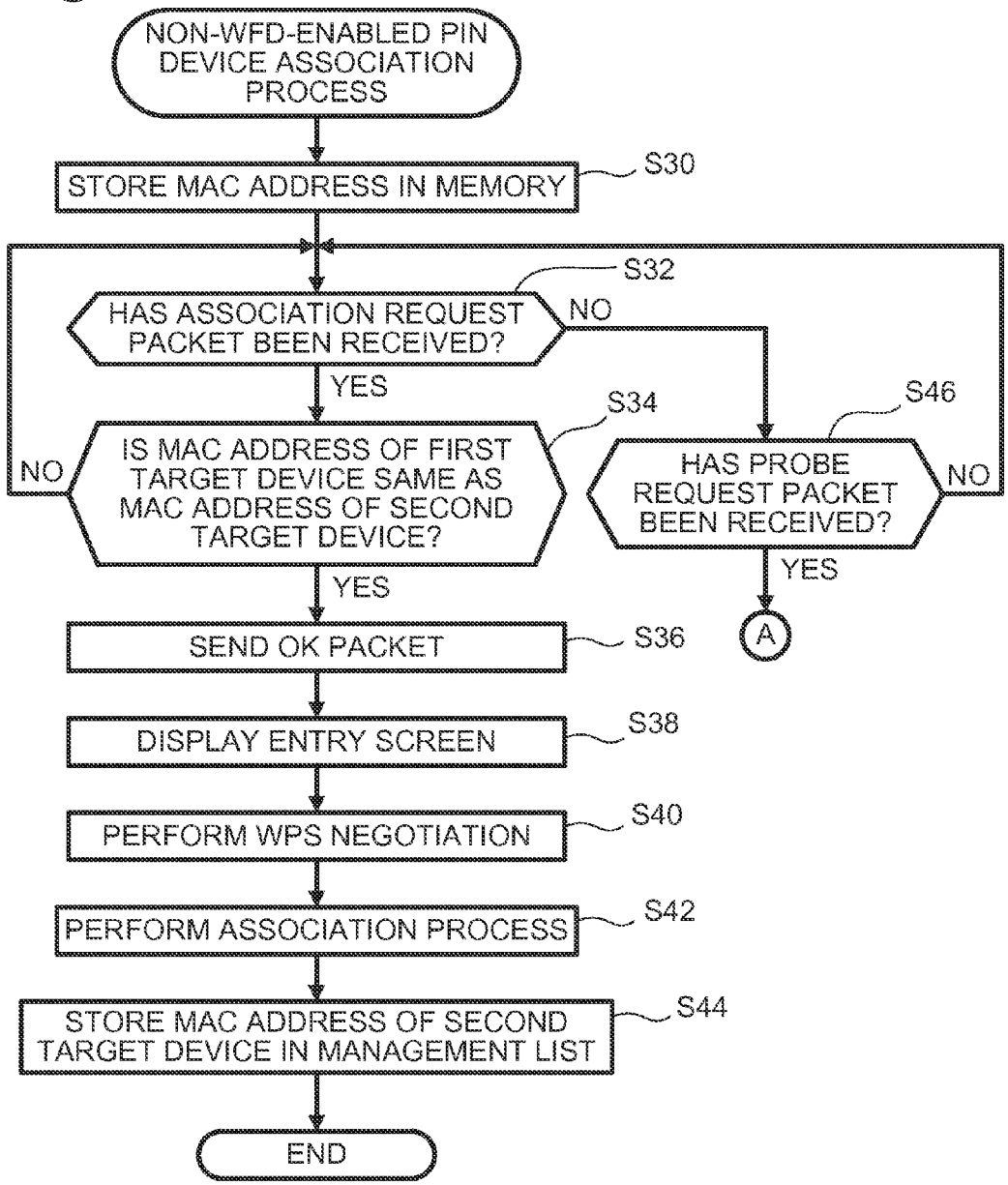
FIG. 3 is a flowchart depicting a non-WFD-enabled PIN device association process in the embodiment according to one or more aspects of the disclosure.

With reference to FIG. 3, the non-WFD-enabled PIN device association process (step S20 of FIG. 2) is described in additional detail. In step S30, the memory control portion 42 may store the MAC address included in the Probe Request packet received from the first target device (e.g., the non-WFD-enabled PIN device) in the memory 32. When the memory 32 has already stored a MAC address of a previous device that is different from the first target device at the time of performing step S30, the memory control portion 42 may replace the existing MAC address of the previous device with the MAC address of the first target device in the memory 32.

In step S32, the second reception-control portion 44 (see FIG. 1) may supervise a receipt of an Association Request packet. Hereinafter, a source device that may send an Association Request packet may be referred to as a "second target device" (e.g., first external device or second external device). The Association Request packet may be sent to request a participation of the second target device in the wireless network including the printer 10. For example, after the first target device receives the Probe Response packet from the printer 10, the first target device may send an Association Request packet to the printer 10. In this case, the first target device may be the same device as the second target device. More specifically, upon receipt of the Probe Response packet from the printer 10, the first target device may display a device list including information indicating the printer 10 on a display portion of the first target device. The user may operate the operation portion of the first target device to select the printer 10 in the device list. Then, the first target device (also corresponding to the second target device in this example) may send an Association Request packet to the printer 10. In this case, the second reception-control portion 44 makes a positive determination (YES) in step S32. The Association Request packet sent by the first target device might not include either of the P2P information and the PBC information.

For example, there may be a possibility that another user who is different from the user who desires that the first target device participate in the wireless network performs an operation for sending an Association Request packet to the printer 10 without performing the method selection on the second target device that is different from the first target device (hereinafter, referred to as a "direct association operation"). In this case, the second target device may send an Association Request packet to the printer 10 directly without sending a Probe Request packet to the printer 10 or receiving a Probe Response packet from the printer 10. In this case, also, the second reception-control portion 44 makes a positive determination (YES) in step S32. Hereinafter, the second target device that may send an Association Request packet only to the printer 10 may be referred to as a "direct association device".

As described above, the Association Request packet received from the second target device, which may be the same device as the first target device, may not include either of the P2P information and the PBC information. The Association Request packet received from the second target device that may be the direct association device may not include either of the P2P information and the PBC information. Therefore, the second target device cannot be identified based on the IE included in the Association Request packet received from the second target device whether it is the same device as the first target device or whether it is a direct association device that is different from the first target device.

When the second reception-control portion 44 makes a positive determination (YES) in step S32 (when an Association Request packet has been received), the routine may move to step S34. When the second reception-control portion 44 makes a negative determination (NO) in step S32 (when an Association Request packet has not been received), the routine may move to step S46.

In step S46, the first reception-control portion 40 may determine whether a Probe Request packet has been received from another device that is different from the first target device. When the first reception-control portion 40 makes a negative determination (NO) in step S46, the routine may return to step S32. When the first reception-control portion 40 makes a positive determination (YES) in step S46, the routine may return to step S16 of FIG. 2. In this case, the memory control portion 42 may perform steps S16 and S18 of FIG. 2 with respect to the Probe Request packet received from the other device.

In step S34, the packet transmission control portion 46 may determine whether the MAC address of the first target device stored in the memory 32 is the same as the MAC address of the second target device included in the Association Request packet. When the packet transmission control portion 46 makes a positive determination (YES) in step S34 (e.g., when the MAC address of the first target device is the same as the MAC address of the second target device), the routine may move to step S36. When the packet transmission control portion 46 makes the positive determination (YES) in step S34, the first target device and the second target device may be determined to be the same device. As described above, the packet transmission control portion 46 cannot determine whether the second target device is the same device as the first target device based on the IE included in the Association Request packet received from the second target device. Therefore, in step S34, the packet transmission control portion 46 may determine whether the second target device and the first target device are the same device based on the determination of whether the MAC address of the first target device stored in the memory 32 is the same as the MAC address of the second target device included in the Association Request packet.

In step S36, the packet transmission control portion 46 may send an OK packet to the second target device when the second target device is the same device as the first target device. The OK packet may be a response packet to the Association Request packet (that is, a positive response packet to the Association Request packet).

When the packet transmission control portion 46 makes a negative determination (NO) in step S34 (when the MAC address of the first target device is different from the MAC address of the second target device), the routine may return to step S32. When the packet transmission control portion 46 makes the negative determination (NO) in step S34, the first target device may be different from the second target device. In this case, the packet transmission control portion 46 may not send an OK packet to the second target device that may be different from the first target device (that is, the direct association device).

In step S38, the display control portion 50 (see FIG. 1) may display an entry screen for entering a PIN code (e.g., authentication information) on the display portion 12 of the printer 10. A display screen for displaying the PIN code may be displayed on the second target device. When a non-WFD-enabled PIN device is allowed to participate in the wireless network including a common AP device, the entry screen may be displayed on a display portion of the AP device and the display screen may be displayed on a display portion of the non-WFD-enabled PIN device. In this illustrative embodiment, in step S38, the display control portion 50 may display the entry screen on the display portion 12 of the printer 10 in the G/O status (that is, the printer 10 that may function as an AP) under such a general rule. The user may confirm the PIN code displayed on the display screen of the second target device and may operate the operating portion 14 of the printer 10 to enter the PIN code on the entry screen displayed on the printer 10. When the entry of the PIN code on the entry screen is detected, the routine may move to step S40.

In step S40, the profile transmission control portion 48 (see FIG. 1) may perform a WPS negotiation with the second target device. More specifically, for example, the profile transmission control portion 48 may convert specific data (for example, the latest packet data transmitted between the printer 10 and the second target device) into a hash code by using the PIN code entered in the printer 10. The second target device may convert the specific data into a hash code by using the PIN code displayed on the second target device. One of the printer 10 (the profile transmission control portion 48) and the second target device may determine whether the hash code generated by the printer 10 is the same as the hash code generated by the second target device.

When the two hash codes are the same, that is, when a PIN code authentication succeeded, the profile transmission control portion 48 may send the second target device a wireless profile (for example, subsystem identification ("SSID"), authentication method, encryption method, and password) that may be required for the second target device to serve as a client in the wireless network including the printer 10. The wireless profile to be sent may be a wireless profile that has been currently used in the existing wireless network including the printer 10.

In step S42, the controller 20 may perform an association process with the second target device by using the wireless profile. That is, controller 20 may perform wireless communication including an Authentication Request, an Authentication Response, an Association Request, and a four-way handshake by using the wireless profile with the second target device.

In step S44, the memory control portion 42 may store the MAC address of the second target device in the client status in the management list 36 of the memory 32. As a result, the second target device (e.g., also the first target device in this case) may be allowed to participate as a client in the wireless network including the printer 10. That is, the second target device may be allowed to wirelessly send print data to the printer 10 by using the wireless profile. After step S44, the non-WFD-enabled PIN device association process may end.

Figure 4:
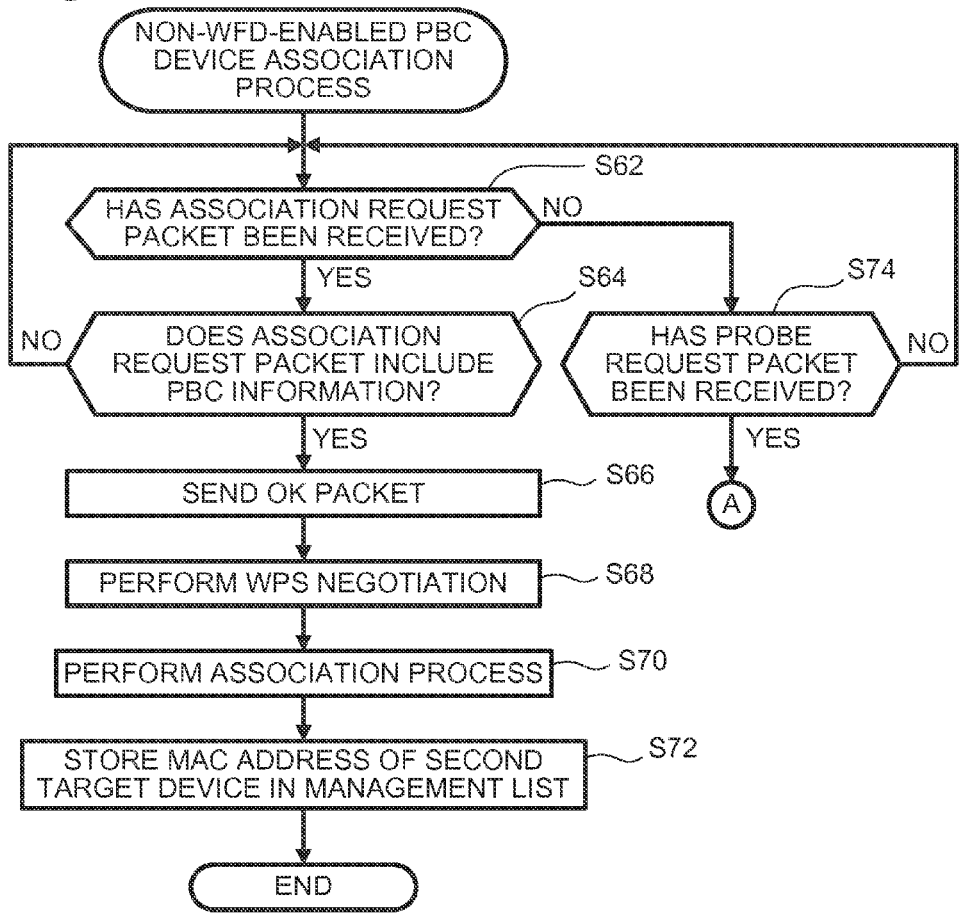
FIG. 4 is a flowchart depicting a non-WFD-enabled PBC device association process in the embodiment according to one or more aspects of the disclosure.

With reference to FIG. 4, a non-WFD-enabled PBC device association process (step S19 of FIG. 2) is now described. Compared to the non-WFD-enabled PIN device association process, the memory control portion 42 may be configured to not store the MAC address of the first target device in the memory 32 (that is, to not perform step S30 of FIG. 3) in the non-WFD-enabled PBC device association process.

In step S62, the second reception-control portion 44 may supervise a receipt of an Association Request packet from the second target device. As described above, the first target device may display the device list including the information indicating the printer 10. The user may operate the operating portion of the first target device to select the printer 10 in the device list. In this case, the first target device (e.g., also the second target device) may send an Association Request packet to the printer 10. When the second reception-control portion 44 makes a positive determination (YES) in step S62 (e.g., when the second reception-control portion 44 has received an Association Request packet), the routine may move to step S64. When the second reception-control portion 44 makes a negative determination (NO) in step S62 (e.g., when the second reception-control portion 44 has not received an Association Request packet), the routine may move to step S74. In some examples, details of step S74 may be the same as the details of step S46 of FIG. 3 described above.

In step S64, the packet transmission control portion 46 may determine whether the Association Request packet includes PBC information. When the packet transmission control portion 46 makes a positive determination (YES) in step S64 (when the Association Request packet includes PBC information), the routine may move to step S66. Generally, the non-WFD-enabled PBC device may send the printer 10 an Association Request packet including PBC information (YES in step S64 of FIG. 4) after sending the printer 10 a Probe Request packet including the PBC information (YES in step S18 of FIG. 2). Therefore, when the packet transmission control portion 46 makes the positive determination (YES) in step S64, the second target device may be determined to be the same device as the first target device. When the packet transmission control portion 46 makes a negative determination (NO) in step S64 (e.g., when the Association Request packet does not include PBC information), the routine may move to step S62. When the packet transmission control portion 46 makes the negative determination (NO) in step S64, the first target device is different from the second target device. For example, the Association Request packet received from the second target device that may be a direct association device does not include PBC information. Therefore, the packet transmission control portion 46 may make the negative determination in step S64. In this case, step S66 and subsequent steps might not be performed and the packet transmission control portion 46 might not send an OK packet to the second target device (e.g., the direct association device) that may be different from the first target device.

In step S66, the packet transmission control portion 46 may send an OK packet to the second target device. Compared to the non-WFD-enabled PIN device association process, in the non-WFD-enabled PBC device association process, the display control portion 50 may be configured to not display the entry screen for entering a PIN code on the display portion 12. In some arrangements, the display portion for displaying the PIN code may not be displayed on the operating portion of the second target device either. Details of steps S68 to S72 may be substantially the same as the details of steps S40 to S44 of FIG. 3. However, in step S68, the printer 10 (the profile transmission control portion 48) and the second target device may convert the specific data into a hash code by using a predetermined PIN code. The other points may be the same as steps S40 to S44 of FIG. 3.

Figure 5:
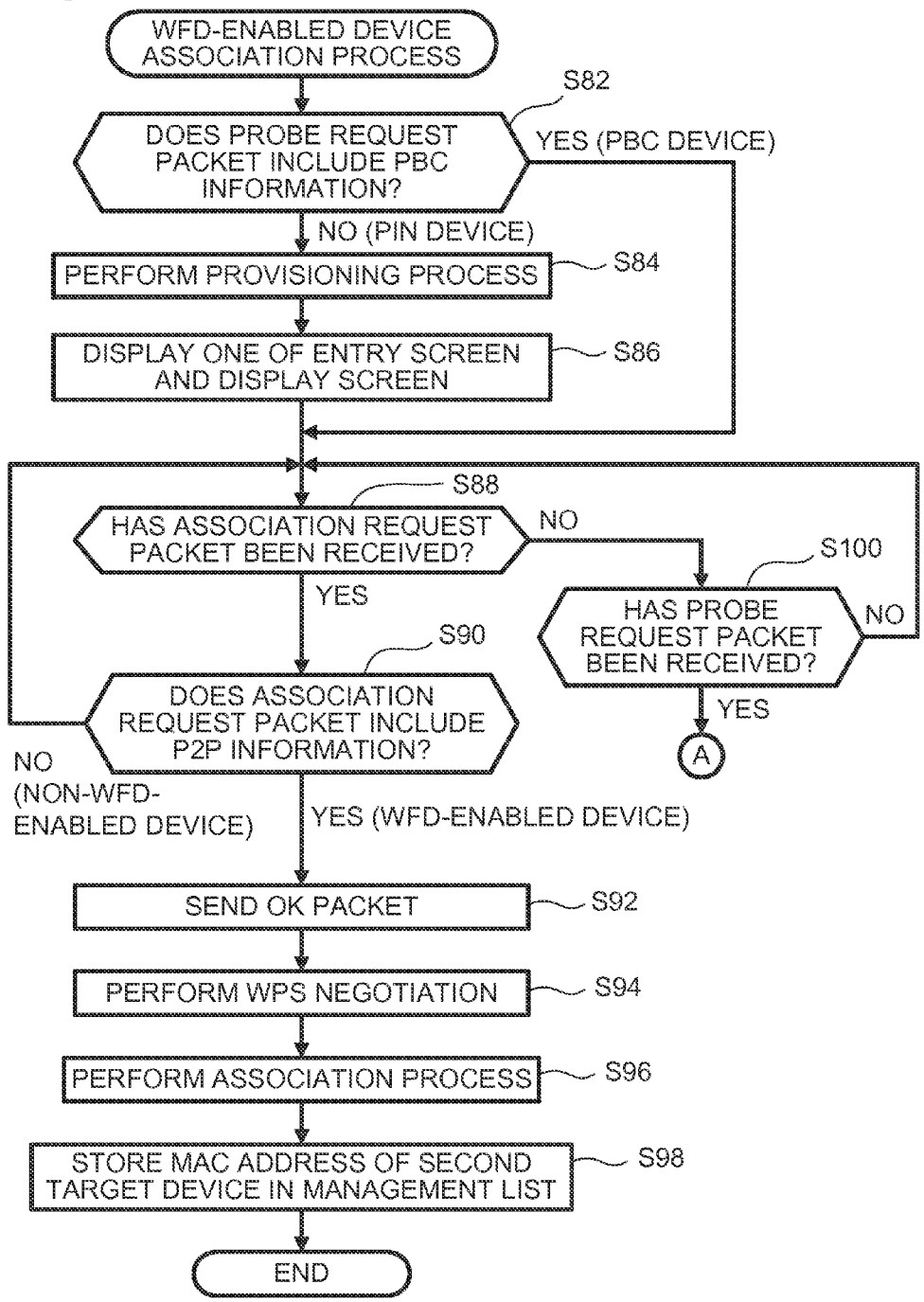
FIG. 5 is a flowchart depicting a WFD-enabled device association process in the embodiment according to one or more aspects of the disclosure.

With reference to FIG. 5, a WFD-enabled device association process (step S22 of FIG. 2) is now described. Compared to the non-WFD-enabled PIN device association process, in the WFD-enabled device association process, the memory control portion 42 may be configured to not store the MAC address of the first target device in the memory 32 (e.g., configured to not perform step S30 of FIG. 3).

In step S82, the memory control portion 42 may determine whether the Probe Request packet received from the first target device includes PBC information. When the memory control portion 42 makes a positive determination (YES) in step S82 (e.g., when the Probe Request packet includes PBC information), the routine may skip steps S84 and S86 and move to step S88. When the memory control portion 42 made the positive determination (YES) in step S82, the first target device may be a WFD-enabled device in which the PBC method may be selected on the operating portion of the first target device. Hereinafter, such a device may be referred to as a "WFD-enabled PBC device".

When the memory control portion 42 makes a negative determination (NO) in step S82 (when the Probe Request packet does not include PBC information), the routine may move to step S84. When the memory control portion 42 makes the negative determination (NO) in step S82, the first target device may be a WFD-enabled device in which the PIN method may be selected on the operating portion of the first target device. Hereinafter, such a device may be referred to as a "WFD-enabled PIN device".

In step S84, the controller 20 may perform a provisioning process with the first target device. As described above, the first target device may display the device list including the information indicating the printer 10. The user may operate the operating portion of the first target device to select the printer 10 in the device list. Further, the user may operate the operating portion of the first target device to select a screen to be displayed on the first target device from the display screen for displaying a PIN code and the entry screen for entering a PIN code. The first target device may send the printer 10 a Provision Discovery Request packet that may indicate a result of the selection between the display screen and the entry screen. When the Provision Discovery Request packet indicates the selection of the display screen, the printer 10 (e.g., via the controller 20) may send the first target device a Provision Discovery Response packet indicating that the entry screen is to be displayed in the printer 10. When the Provision Discovery Request packet indicates the selection of the entry screen, the printer 10 (e.g., via the controller 20) may send the first target device a Provision Discovery Response packet indicating that the display screen is to be displayed in the printer 10.

In step S86, the display control portion 50 may selectively display one of the entry screen and the display screen on the display portion 12 in accordance with the result of the provisioning process of step S62. For example, when the printer 10 sends the first target device the Provision Discovery Response packet indicating that the entry screen is to be displayed in the printer 10, the display control portion 50 may display the entry screen on the display portion 12 in step S86. When the printer 10 sends the first target device the Provision Discovery Response packet indicating that the display screen is to be displayed in the printer 10, the display control portion 50 may display the display screen on the display portion 12 in step S86. After step S86, the routine may move to step S88.

In step S88, the second reception-control portion 44 may supervise a receipt of an Association Request packet from the second target device. When the second reception-control portion 44 makes a positive determination (YES) in step S88 (e.g., when the second reception-control portion 44 has received an Association Request packet), the routine may move to step S90. When the second reception-control portion 44 makes a negative determination (NO) in step S88 (e.g., when the second reception-control portion 44 has not received an Association Request packet), the routine may move to step S100. In some arrangements, details of step S100 may be the same as the details of step S46 of FIG. 3.

In step S90, the packet transmission control portion 46 may determine whether the Association Request packet include P2P information. When the packet transmission control portion 46 made a positive determination (YES) in step S90 (e.g., when the Association Request packet includes P2P information), the routine may move to step S92. The WFD-enabled device (e.g., one of the WFD-enabled PBC device and the WFD-enabled PIN device) may send the printer 10 an Association Request packet including P2P information (YES in step S90 of FIG. 5) after sending the printer 10 the Probe Request packet including P2P information (YES in step S16 of FIG. 2). Therefore, when the packet transmission control portion 46 makes the positive determination (YES) in step S90, the second target device may be the same device as the first target device. When the packet transmission control portion 46 makes a negative determination (NO) in step S90 (when the Association Request packet does not include P2P information), the routine may return to step S88. When the packet transmission control portion 46 makes the negative determination (NO) in step S90, the first target device may be different from the second target device. For example, the Association Request packet received from the second target device that may be the direct association device may not include P2P information. Therefore, the packet transmission control portion 46 may make the negative determination in step S90. In this case, step S92 and subsequent steps might not be performed and the packet transmission control portion 46 might not send an OK packet to the second target device (e.g., as the direct association device) that may be different from the first target device.

In step S92, the packet transmission control portion 46 may send an OK packet to the second target device. When a PIN code has been entered on the entry screen displayed on one of the display portion 12 of the printer 10 and the display portion of the second target device (see step S86), the routine may move to step S94. When the memory control portion 42 makes the positive determination (YES) in S82 (e.g., when the first target device is a WFD-enabled PBC device), the routine may move to step S94 without the entry of a PIN code.

According to one or more arrangements, details of steps S94 to S98 may be the same as the details of steps S40 to S44 of FIG. 3 (e.g., when the first target device is a WFD-enabled PIN device) or the details steps S68 to S72 of FIG. 4 (e.g., when the first target device is a WFD-enabled PBC device).

Figure 6:
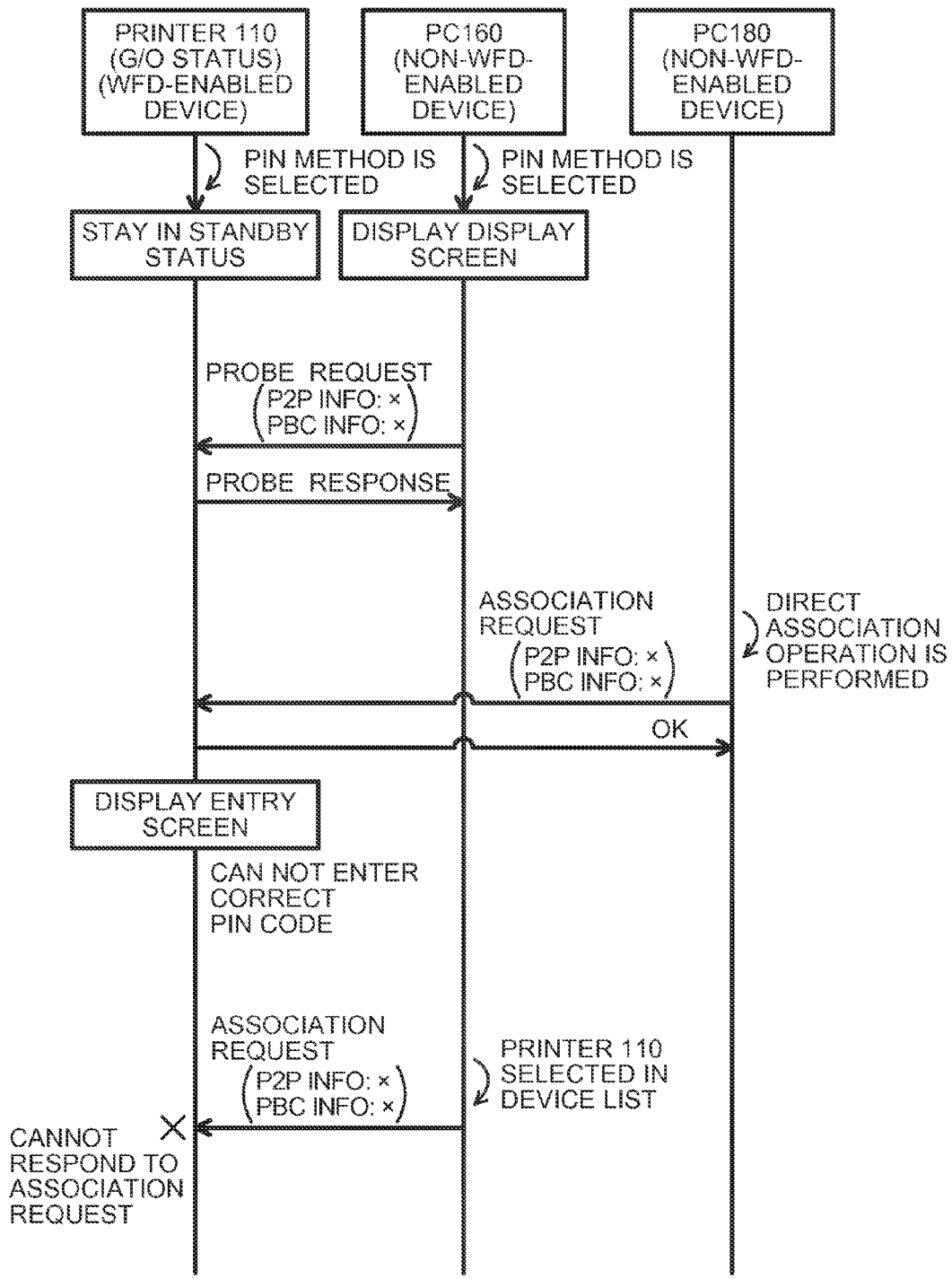
FIG. 6 is a sequence diagram depicting operations performed by each device in another example embodiment.

With reference to FIG. 6, details of processing performed in each device according to a second embodiment are described below. The second embodiment may be an example made to be compared with the illustrative embodiment of the disclosure. In this example second embodiment, the above-described G/O process might not be performed. In FIG. 6, it may be assumed that a wireless connection is established by using the PIN method of the WPS between a printer 110, which may serve as a group owner (AP), and a PC 160. In FIG. 6, the printer 110 may be a WFD-enabled device and the PC 160 and a PC 180 may be non-WFD-enabled devices.

The user may perform the method selection on an operating portion of the printer 110 to select the PIN method. Further, the user may perform the method selection on an operating portion of the PC 160 to select the PIN method. In this case, the PC 160 may display a display screen for displaying a PIN code on the display portion of the PC 160.

The PC 160 may wirelessly send a Probe Request packet to the printer 110. The Probe Request packet might not include either of the P2P information or the PBC information. Upon receipt of the Probe Request packet, the printer 110 may send a Probe Response packet to the PC 160. Upon receipt of the Probe Response packet from the printer 110, the PC 160 may display a device list indicating information about the printer 110 on the display portion of the PC 160. The user may select the printer 110 in the device list on the operating portion of the PC 160.

Before the user selects the printer 110 on the PC 160, another user may perform the direct association operation on the operating portion of the PC 180 to send an Association Request packet to the printer 110. In this case, the PC 180 (e.g., as the direct association device) may wirelessly send an Association Request packet to the printer 110. Upon receipt of the Association Request packet from the PC 180, the printer 110 may wirelessly send an OK packet to the PC 180.

As the printer 110 sent the OK packet to the PC 180, the printer 100 may display the entry screen on the display portion thereof. However, the display screen might not be displayed on the display portion of the PC 180 because the method selection for selecting the PIN method has not been performed on the PC 80 although the direct association operation was performed on the PC 80. Therefore, the user may not be able to (e.g., might not be allowed to) input a PIN on the entry screen displayed on the printer 110.

Under this condition, when the user further selects the printer 110 in the device list displayed on the PC 160, the PC 160 may wirelessly send an Association Request packet to the printer 110. However, the printer 110 might not perform a sequence for establishing a wireless connection between the PC 160 and the printer 110 even though the printer 110 receives the Association Request packet from the PC 160. This may result from the printer 110 having sent the OK packet to the PC 180 in response to the Association Request packet received from the PC 180 before the printer 110 received the Association Request packet from the PC 160. Consequently, the printer 110 may perform a sequence for establishing a wireless connection between the PC 180 and the printer 110 (e.g., a sequence for allowing the printer 110 to perform communication to establish a wireless connection with the PC 180 only). Thus, the PC 160 might not be allowed to participate in the wireless network. With the configuration according to this second embodiment, when the printer 110 receives an Association Request packet from the PC 180, which may be a direct association device, before the printer 110 establishes a wireless connection with the PC 160, which may be a non-WFD-enabled PIN device and may be desired to be participate in the existing wireless network including the printer 110, the PC 160 might not be allowed to participate in the existing wireless network appropriately. As described above, the user might not know the correct PIN code of the PC 180. Therefore, the PC 180 might not be joined to the wireless network either because the user does not know the correct PIN code.

Figure 7:
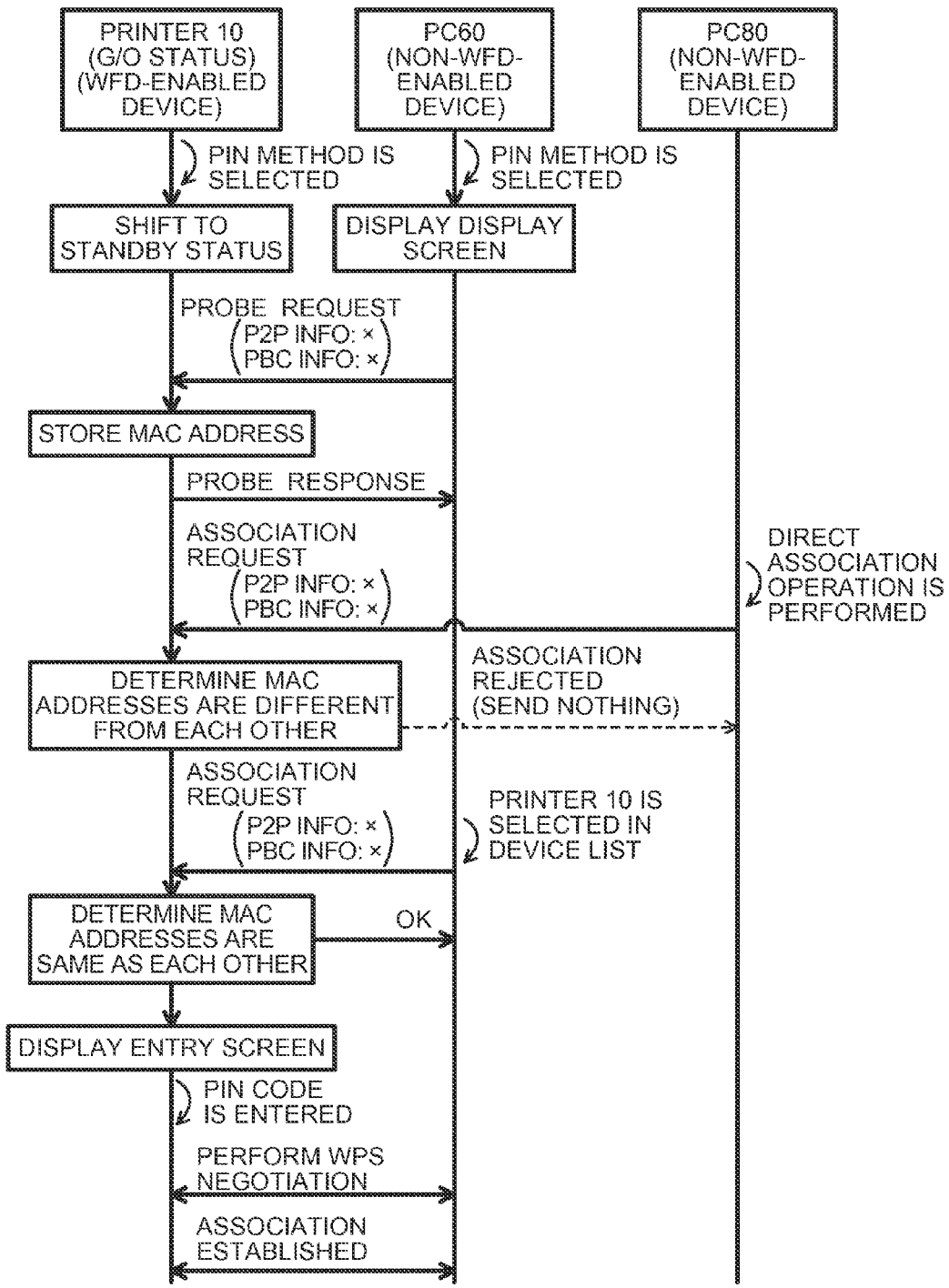
FIG. 7 is a sequence diagram depicting operations performed by each device (case A1) in the embodiment according to one or more aspects of the disclosure.

In FIG. 7, it may be assumed that a wireless connection is established by using the PIN method of the WPS between the printer 110, which may serve as a group owner (AP), and the PC 60 (e.g., a non-WFD-enabled device) (case A1).

Similar to the second embodiment, the user may perform the method selection on the operating portion 14 of the printer 10 to select the PIN method. Further, the user may perform the method selection on the operating portion of the PC 60 to select the PIN method. In this case, the PC 60 may display the display screen for displaying a PIN code on the display portion of the PC 60. Then, the PC 60 may wirelessly send a Probe Request packet to the printer 10.

The Probe Request packet received from the PC 60 might not include either of the P2P information or the PBC information. Therefore, the printer 10 may make a negative determination (NO) in step S16 and in step S18 of FIG. 2. As a result, the printer 10 may store a MAC address (e.g., first specific information or target-device identifying information) of the PC 60 included in the Probe Request packet in the memory 32 (step S30 of FIG. 3). In one example, the first specific information and the target-device identifying information may be the same information as each other.

Similar to the second embodiment, upon receipt of the Probe Response packet from the printer 10, the PC 60 may display a device list indicating the information about the printer 10 on the display portion of the PC 60.

Before the user selects the printer 10 on the PC 60, another user may perform the above-described direct association operation through the operating portion of the PC 80. In this case, the PC 80 may wirelessly send an Association Request packet to the printer 10.

Upon receipt of the Association Request packet from the PC 80, the printer 10 may determine that a MAC address (e.g., second specific information) of PC 80 included in the Association Request packet is not the same as the MAC address of PC 60 stored in the memory 32 (e.g., a negative determination (NO) in step S34 of FIG. 3). In this case, the printer 10 might not send an OK packet to the PC 80. Therefore, the printer 10 may supervise the receipt of the Association Request packet from the PC 60 without moving to the sequence for establishing a wireless connection with the PC 80.

Then, when the printer 10 is selected on the PC 60, the PC 60 may wirelessly send an Association Request packet to the printer 10. Upon receipt of the Association Request packet from the PC 60, the printer 10 may determine that the MAC address of the PC 60 included in the Association Request packet is the same as the MAC address of the PC 60 stored in the memory 32 (e.g., a positive determination (YES) in step S34 of FIG. 3). Therefore, the printer 10 may send an OK packet to the PC 60 (e.g., step S36 of FIG. 3). Upon sending of the OK packet to the PC 60, the printer 10 may display the entry screen on the display portion thereof (e.g., step S38 of FIG. 3).

The user may enter a PIN code displayed on the PC 60 into the entry screen displayed on the printer 10. Thus, a WPS negotiation and a wireless connection may be performed between the printer 10 and the PC 60 (e.g., steps S40 and S42 of FIG. 3, respectively). Therefore, the PC 60 may be allowed to serve as a client in the existing wireless network including the printer 10. According to case A1, the printer 10 might not send an OK packet to the PC 80 although the printer 10 receives the Association Request packet from the PC 80 that may be a direct association device. Therefore, the printer 10 might not perform a sequence for establishing a wireless connection with the PC 80. For example, when the printer 10 receives the Association Request packet from the PC 60 that may be a non-WFD-enabled PIN device, the printer 10 may send an OK packet to the PC 60 and move a sequence for establishing a wireless connection with PC 60 (e.g., steps S38 to S44 of FIG. 3). Thus, the PC 60 that may be a non-WFD-enabled PIN device may be allowed to serve as a client appropriately in the existing wireless network including the printer 10.

In FIG. 8, similar to case A1 (see FIG. 7), it may be assumed that a wireless connection is established by using the PIN method of the WPS between the printer 10, which may serve as a group owner, and the PC 60 (non-WFD-enabled device) (case A2).

In case A2, after the method selection for selecting the PIN method on the printer 10, the user may perform the method selection on the PC 80 by mistake instead of performing the method selection on the PC 60. In this case, the PC 80 may wirelessly send a Probe Request packet to the printer 10 after displaying the display portion on the display screen of the PC 80.

The Probe Request packet received from the PC 80 might not include either the P2P information or the PBC information. Therefore, the printer 10 may store a MAC address of the PC 80 included in the Probe Request packet in the memory 32 (e.g., step S30 of FIG. 3). Upon receipt of the Probe Response packet from the printer 10, the PC 80 may display a device list including the information about the printer 10 on the display portion of the PC 80.

The user may realize he or she made a mistake of performing the method selection on the PC 80 and may subsequently perform the method selection on the PC 60. In this case, the PC 60 may display the display screen for displaying a PIN code on the display portion and wirelessly send a Probe Request packet to the printer 10.

The Probe Request packet received from the PC 60 might not include either the P2P information or the PBC information. Therefore, the printer 10 may store a MAC address of the PC 60 included in the Probe Request packet in the memory 32 (e.g., step S30 of FIG. 3). At that time, the printer 10 may replace the MAC address of the PC 60 with the existing MAC address of the PC 80 in the memory 32. Upon receipt of the Probe Response packet from the printer 10, the PC 60 may display a device list indicating the information about the printer 10 on the display portion of the PC 60.

When the printer 10 is selected on the PC 60, the PC 60 may wirelessly send an Association Request packet to the printer 10. Upon receipt of the Association Request packet from the PC 60, the printer 10 may determine that the MAC address of the PC 60 included in the Association Request packet is the same as the MAC address of the PC 60 stored in the memory 32 (a positive determination (YES) in step S34 of FIG. 3). Therefore, the printer 10 may send an OK packet to the PC 60 (step S36 of FIG. 3). Processing to be performed after step S36 may be the same as the processing to be performed in case A1 (e.g., steps S38 to S44 of FIG. 3).

In case A2, the PC 60 may be allowed to serve as a client appropriately in the existing wireless network including the printer 10 even when the user performs the method selection on the PC 60 after performing the method selection on the PC 80 by mistake.

In FIG. 9, it may be assumed that a wireless connection is established by using the PBC method of the WPS between the printer 110, which may serve as a group owner, and the PC 60 (non-WFD-enabled device) (case B).

The user may perform the method selection on the operating portion 14 of the printer 10 to select the PBC method. Further, the user may perform the method selection on the operating portion of the PC 60 to select the PBC method. In this case, the PC 60 may wirelessly send a Probe Request packet to the printer 10 but might not display the display screen on the display portion of the PC 60.

In some arrangements, the Probe Request packet received from the PC 60 may include the PBC information but not include the P2P information. Therefore, the printer 10 may make a negative determination (NO) in step S16 of FIG. 2 and make a positive determination (YES) in step S18 of FIG. 2. Thus, the printer 10 might not store the MAC address of the PC 60 in the memory 32. Upon receipt of the Probe Response packet from the printer 10, the PC 60 may display a device list indicating the information about the printer 10 on the display portion of the PC 60.

Before the user selects the printer 10 on the PC 60, another user may perform the above-described direct association operation through the operating portion of the PC 80. In this case, the PC 80 may wirelessly send an Association Request packet to the printer 10.

Upon receipt of the Association Request packet from the PC 80, the printer 10 may determine that the Association Request packet does not include the PBC information (e.g., a negative determination (NO) in step S64 of FIG. 4). In this case, the printer 10 may not send an OK packet to the PC 80. Therefore, the printer 10 may be allowed to supervise the receipt of the Association Request packet from the PC 60 without moving to the sequence for establishing a wireless connection with the PC 80.

Then, when the printer 10 is selected on the PC 60, the PC 60 may wirelessly send an Association Request packet to the printer 10. Upon receipt of the Association Request packet from the PC 60, the printer 10 may determine that the Association Request packet includes the PBC information (e.g., a positive determination (YES) in step S64 of FIG. 4). Therefore, the printer 10 may send an OK packet to the PC 60 (e.g., step S66 of FIG. 4). Upon sending of the OK packet to the PC 60, a WPS negotiation and a wireless connection may be performed between the printer 10 and the PC 60 (e.g., steps S68 and S70 of FIG. 4). Thus, the PC 60 that may be a non-WFD-enabled PBC device may be allowed to serve as a client appropriately in the existing wireless network including the printer 10.

In FIG. 10, it may be assumed that a wireless connection is established by using the PIN method of the WPS between the printer 10, which may serve as a group owner, and the PC 70 (WFD-enabled device) (case C).

In case C, also, the user may perform the method selection on the operating portion 14 of the printer 10 to select the PIN method. Further, the user may perform the method selection on the operating portion of the PC 70 to select the PIN method. In this case, the PC 70 may wirelessly send a Probe Request packet to the printer 10.

The Probe Request packet received from the PC 70 may include the P2P information but not include the PBC information. Therefore, the printer 10 may make a positive determination (YES) in step S16 of FIG. 2. Thus, the printer 10 may not store the MAC address of the PC 70 in the memory 32. Upon receipt of the Probe Response packet from the printer 10, the PC 70 may display a device list indicating the information about the printer 10 on the display portion of the PC 70.

Then, when the printer 10 is selected on the PC 70, the PC 70 may shift to the client status from the device status. After that, the PC 70 may display a display/entry screen selecting screen on a display portion of the PC 70. The display/entry screen selecting screen may be used for allowing the user to select one of the display screen for displaying a PIN code and the entry screen for entering a PIN code for display on the display portion of the PC 70. The user may operate an operating portion of the PC 70 to perform a selecting operation for selecting the display of the display screen.

Then, the printer 10 may perform the provisioning process (e.g., step S84 of FIG. 5) with the PC 70. After the provisioning process, the printer 10 may display the entry screen for entering a PIN code on the display portion 12. The PC 70 may display the display screen for displaying a PIN code.

Before the PC 70 wirelessly sends an Association Request packet to the printer 10, the direct association operation may be performed on the PC 80. The PC 80 may wirelessly send an Association Request packet to the printer 10.

Upon receipt of the Association Request packet from the PC 80, the printer 10 may determine that the Association Request packet does not include the P2P information (e.g., a negative determination (NO) in step S90 of FIG. 5). In this case, the printer 10 may not send an OK packet to the PC 80. Therefore, the printer 10 may be allowed to supervise the receipt of the Association Request packet from the PC 70 without moving to (e.g., performing) the sequence for establishing a wireless connection with the PC 80.

Then, the PC 70 may wirelessly send an Association Request packet to the printer 10. Upon receipt of the Association Request packet from the PC 70, the printer 10 may determine that the Association Request packet includes the P2P information (e.g., a positive determination (YES) in step S90 of FIG. 5). In this case, the printer 10 may send an OK packet to the PC 70 (e.g., step S92 of FIG. 5). Therefore, a WPS negotiation and a wireless connection may be performed between the printer 10 and the PC 70 (e.g., steps S94 and S96 of FIG. 5, respectively). Thus, the PC 70 that may be a WFD-enabled device may be allowed to serve as a client appropriately in the existing wireless network including the printer 10.

In the above-described illustrative embodiment of the disclosure, the printer 10 might not store the MAC address of the first target device in the memory 32 when the Probe Request packet received from the first target device includes either the P2P information or the PBC information (e.g., a positive determination (YES) in step S16 or in step S18 of FIG. 2). Upon receipt of the Association Request packet from the second target device (e.g., a positive determination (YES) in step S62 of FIG. 4 or in step S88 of FIG. 5), the printer 10 may send an OK packet to the second target device that may be the same device as the first target device (e.g., step S66 of FIG. 4 or step S92 of FIG. 5), and send a wireless profile to the first target device that may be the same device as the second target device (step S68 of FIG. 4 or step S94 of FIG. 5). Thus, the first target device may be allowed to serve as a client appropriately in the wireless network.

The printer 10 may store the MAC address of the first target device in the memory 32 (e.g., step S30 in FIG. 3) when the Probe Request packet received from the first target device does not include either the P2P information or the PBC information (e.g., a negative determination (NO) in steps S16 and S18 of FIG. 2). In this case, when the MAC address of the first target device stored in the memory 32 is the same as the MAC address of the second target device (e.g., a positive determination (YES) in step S34 of FIG. 3), the printer 10 may send an OK packet to the second target device that may be the same device as the first target device (e.g., step S36 of FIG. 3) and may send a wireless profile to the second target device that may be the same device as the first target device (e.g., step S40 of FIG. 3). Thus, the first target device may be allowed to serve as a client appropriately in the wireless network. When the MAC address of the first target device stored in the memory 32 is different from the MAC address of the second target device (e.g., a negative determination (NO) in step S34 of FIG. 3), the printer 10 might not send an OK packet to the second target device. This configuration may reduce the likelihood that the first target device is not allowed to serve as a client in the wireless network due to the sending of an OK packet to an undesired device that may be different from the first target device (e.g., the event described in the second embodiment in FIG. 6). Accordingly, the first target device may be allowed to serve as a client appropriately in the wireless network.

In the above-described embodiment, as depicted in FIG. 7, when the printer 10 stores the MAC address of the first target device (e.g., a WFD-non-enabled device such as PC 60) in the memory 32, the printer 10 may display the entry screen on the display portion 12 after receiving the Association Request packet from the second target device (e.g., PC 60). As depicted in FIG. 10, when the printer 10 does not store the MAC address of the first target device (e.g., a WFD-enabled device such as PC 70) in the memory 32, the printer 10 may selectively display one of the entry screen and the display screen before receiving the Association Request packet from the second target device (e.g., PC 70). That is, the printer 10 may selectively display one of the entry screen and the display screen in accordance with whether the MAC address of the first target device is to be stored in the memory 32. Accordingly, the printer 10 may display an appropriate screen on the display portion 12 at an appropriate timing.

Various embodiments of the disclosure have been described above; however, such embodiments are only examples and do not limit the scope of the appended claims. Examples of the modification and alternations of the above-described embodiment are described below.

In the above-described embodiment, the memory control portion 42 may store the MAC address of the first target device in the memory 32 when the Probe Request packet received from the first target device does not include either the P2P information or the PBC information. Nevertheless, in other embodiments, for example, the memory control portion 42 may store the MAC address of the first target device when the Probe Request packet received from the first target device includes the P2P information but not the PBC information. In this case, in step S90 of FIG. 5, the packet transmission control portion 46 may determine whether the MAC address of the first target device is the same as the MAC address of the second target device. In this case, the PBC information may be an example of the first predetermined information. The memory control portion 42 may store the MAC address of the first target device in the memory when the Probe Request packet received from the first target device includes the PBC information but not the P2P information. In this case, in step S64 of FIG. 4, the packet transmission control portion 46 may determine whether the MAC address of the first target device is the same as the MAC address of the second target device. In this case, the P2P information may be an example of the first predetermined information.

In the above-described embodiment, the memory control portion 42 might not store the MAC address of the first target device in the memory 32 when the Probe Request packet includes one of the P2P information and the PBC information. Nevertheless, in other embodiments, for example, the memory control portion 42 may store the MAC address of the first target device in the memory 32 regardless of whether the Probe Request packet includes one of the P2P information and the PBC information. In this case, information indicating the type of the first target device, such as non-WFD-enabled PIN device, non-WFD-enabled PBC device, WFD-enabled PIN device, or WFD-enabled PBC device, may be stored in the memory 32 in association with the MAC address of the first target device. When a combination of the MAC address and the information indicating that the first target device is a non-WFD-enabled PIN device are stored in the memory 32, the packet transmission control portion 46 may determine whether the MAC address of the second target device is the same as the MAC address stored in the memory 32 (step S34 of FIG. 3). When the MAC address and the information indicating that the first target device is other type than the non-WFD-enabled PIN device are stored in the memory 32, the packet transmission control portion 46 may not perform the determination of step S34 of FIG. 3. In this case, the combination of the MAC address and the non-WFD-enabled PIN device may be an example of the first specific information or the second specific information, respectively. The MAC address may be an example of the target-device identifying information. Generally, the first specific information may comprise the target-device identifying information only (the illustrative embodiment of the disclosure) or may comprise other information (for example, the information indicating the type of the device) as well as the target-device identifying information (this modification).

In the above-described embodiment, when the memory control portion 42 stores the MAC address of the first target device in the memory 32, the display control portion 50 may display the entry screen on the display portion 12 after the second reception-control portion 44 received the Association Request packet from the second target device (see FIG. 7). Nevertheless, in other embodiments, the display control portion 50 may display the entry screen on the display portion 12 before the second reception-control portion 44 receives the Association Request packet from the second target device. When the memory control portion 42 does not store the MAC address of the first target device in the memory 32, the display control portion 50 may selectively display one of the entry screen and the display screen on the display portion 12 before the second reception-control portion 44 receives the Association Request packet from the second target device (see FIG. 10). Nevertheless, in other embodiments, the display control portion 50 may selectively display one of the entry screen and the display screen on the display portion 12 after the second reception-control portion 44 received the Association Request packet from the second target device. Generally, when the first specific information is stored in a memory, a display control portion may display the entry screen on the display portion. When the first specific information is not stored in the memory, the display control portion may selectively display one of the entry screen and the display screen on the display portion.

In the above-described embodiment, the printer 10 may be a WFD-enabled device. Nevertheless, in other embodiments, for example, the printer 10 may be a non-WFD-enabled device. Generally, the wireless communication device may be a WFD-enabled device or non-WFD-enabled device that may be a common AP.

The wireless communication device is not be limited to the printer 10 but may include or correspond to other devices that may be allowed to perform wireless communication (for example, mobile phones, personal digital assistants ("PDAs"), PCs, servers, facsimile machines, copying machines, scanners, or multifunction peripheral devices).

In the above-described illustrative embodiment, the portions 40-50 may be implemented by the performance of the processing by the CPU 30 of the printer 10 in accordance with the software. Nevertheless, in other embodiments, for example, a part of the portions 40-50 may be implemented by hardware, for example, a logical circuit.

Further, the technical elements described in the specification and the drawings exhibit technical usability alone or in various combinations, and are not limited to those in the claims at the time of the application of the disclosure. Furthermore, the techniques described as examples in the specification or drawings achieves a plurality of objects simultaneously, and has technical utility by achieving any one of these objects.

What is claimed is:
1. A wireless communication device, comprising:
a processor; and
a memory storing computer-readable instructions therein, the computer-readable instructions, when executed, causing the wireless communication device to perform a wireless connection process comprising:
receiving a first-type packet from a target device seeking to join a wireless network to which the wireless communication device belongs, the first-type packet comprising target device identifying information specific to the target device;
when the first-type packet received from the target device does not include first wireless-connection-method-type information, storing first specific information in the memory, the first specific information comprising the target device identifying information;
when the first-type packet received from the target device includes the first wireless-connection-method-type information, not storing the first specific information in the memory;
receiving a second-type packet from a first external device after receiving the first-type packet and before allowing the target device to join the wireless network, the second-type packet comprising first external device identifying information specific to the first external device;
determining whether the received target device identifying information included in the first specific information currently stored in the memory is the same as the received first external device identifying information included in the second-type packet;
if the first specific information is currently stored in the memory, the second-type packet is received from the first external device and the target device identifying information is the same as the first external device identifying information, sending a third-type packet to the first external device, the third-type packet indicating that the first external device is allowed to join the wireless network;
if the first specific information is currently stored in the memory, the second-type packet is received from the first external device and the target device identifying information is different from the first external device identifying information, not sending the third-type packet to the first external device; and
if the third-type packet is sent to the first external device, further sending, to the first external device after the third-type packet is sent, a wireless profile required for the first external device to join the wireless network.

2. The wireless communication device according to claim 1, wherein the computer-readable instructions, when executed, further cause the wireless communication device to perform:
if the target device identifying information included in the first specific information is different from the first external device identifying information, receiving another second-type packet from a second external device different from the first external device, the other second-type packet comprising identifying information for the second external device;
if the target device identifying information included in the first specific information is the same as the second external device identifying information, sending the third-type packet to the second external device; and
sending the wireless profile to the second external device if the third type packet is sent to the second external device.

3. The wireless communication device according to claim 1, wherein the computer-readable instructions, when executed, further cause the wireless communication device to perform:
displaying an entry screen for entering authentication information on a display portion of the wireless communication device if the first specific information is currently stored in the memory; and
selectively displaying one of the entry screen and a display screen for displaying the authentication information on the display portion of the wireless communication device if the first specific information is not currently stored in the memory.

4. The wireless communication device according to claim 3, wherein the authentication information includes a PIN code corresponding to the first external device.

5. The wireless communication device according to claim 3, wherein the computer-readable instructions, when executed, cause the wireless communication device to perform:
displaying the entry screen on the display portion of the wireless communication device after receiving the second-type packet from the first external device if the first specific information is currently stored in the memory; and
selectively displaying one of the entry screen and the display screen before receiving the second-type packet from the first external device if the first specific information is not currently stored in the memory.

6. The wireless communication device according to claim 3, wherein selectively displaying one of the entry screen and the display screen before receiving the second-type packet from the first external device includes:
receiving an instruction from the first external device specifying one of the entry screen and the display screen to be displayed on the wireless communication device.

7. The wireless communication device according to claim 1, wherein the computer-readable instructions, when executed, cause the wireless communication device to perform:
receiving another first-type packet from another device before receiving the first-type packet from the target device, the other first-type packet comprising identifying information for the other device;
if the other first-type packet received from the other device does not include the first wireless-connection-method-type information, storing second specific information in the memory, the second specific information comprising the other device identifying information; and
if the second specific information is already currently stored in the memory and the first-type packet received from the target device does not include the first wireless-connection-type information, storing the first specific information in the memory by replacing the second specific information stored in the memory.

8. The wireless communication device according to claim 1, wherein the computer-readable instructions, when executed, cause the wireless communication device to perform:
if the first-type packet received from the target device does not include the first wireless-connection-method-type information and does not include a second wireless-connection-method-type information that is different from the first wireless-connection-method-type information, storing the first specific information in the memory; and
if the first-type packet received from the target device includes at least one of the first wireless-connection-method-type information and the second wireless-connection-method-type information, not storing the first specific information in the memory.

9. The wireless communication device according to claim 8, wherein the first wireless-connection-method-type information is Push-Button-Configuration (PBC) information indicating that the target device is to participate in the wireless network in accordance with PBC, and
wherein the second wireless-connection-method-type information is Wi-Fi Direct (WFD) information indicating that the target device is to participate in the wireless network in accordance with a wireless network participation method based on WFD.

10. The wireless communication device according to claim 1, wherein the first-type packet is a Probe Request packet;
the second-type packet is an Association Request packet; and
the third-type packet is an OK packet that is a response packet to the Association Request packet.

11. The wireless communication device according to claim 1, wherein the wireless communication device is configured to serve as a master device in the wireless network and the target device is configured to serve as a slave device in the wireless network.

12. The wireless communication device according to claim 1, wherein the computer readable instructions, when executed, further cause the wireless communication device to send the third-type packet to the first external device if the first specific information is not currently stored in the memory and the second-type packet is received.

13. The wireless communication device according to claim 1, wherein the computer-readable instructions, when executed, further cause the wireless communication device to perform:
joining the first external device to the wireless network; and
upon joining the first external device to the wireless network, storing the first external device identifying information to a device management list of the wireless network.

14. The wireless communication device according to claim 1, wherein the computer-readable instructions, when executed, further cause the wireless communication device to perform:

determining whether a wireless connection method selection has been performed; and in response to determining the wireless connection method selection has been performed, entering a state in which the wireless communication device is configured to receive the first-type packet.

15. The wireless communication device according to claim 1, wherein the memory stores additional computer-readable instructions that, when executed, cause the wireless communication device to perform:

determining whether the wireless communication device is in a group owner state; and in response to determining the wireless communication device is in the group owner state, executing the computer-readable instructions to perform the wireless connection process.

16. The wireless communication device according to claim 1, wherein the target device identifying information is unique, within the wireless network, to the target device, and wherein the first external device identifying information is unique, within the wireless network, to the first external device.

17. A non-transitory, computer-readable storage medium storing computer-readable instructions that, when executed, cause a wireless communication device to perform:

receiving a first-type packet from a target device seeking to join a wireless network to which the wireless communication device belongs, the first-type packet comprising target device identifying information specific to the target device;

when the first-type packet received from the target device does not include first wireless-connection-method-type information, storing first specific information in memory, the first specific information comprising the target device identifying information;

when the first-type packet received from the target device includes the first wireless-connection-method-type information, not storing the first specific information in the memory;

receiving a second-type packet from a first external device after receiving the first-type packet and before allowing the target device to join the wireless network, the second-type packet comprising first external device identifying information specific to the first external device;

determining whether the received target device identifying information included in the first specific information currently stored in the memory is the same as the received first external device identifying information included in the second-type packet;

if the first specific information is currently stored in the memory, the second-type packet is received from the first external device and the target device identifying information is the same as the first external device identifying information, sending a third-type packet to the first external device, the third-type packet indicating that the first external device is allowed to join a wireless network;

if the first specific information is currently stored in the memory, the second-type packet is received from the first external device and the target device identifying information is different from the first external device identifying information, not sending the third-type packet to the first external device; and if the third-type packet is sent to the first external device, further sending, to the first external device after the third-type packet is sent, a wireless profile required for the first external device to join the wireless network.

18. A method of controlling a wireless communication device comprising:

receiving, by the wireless communication device, a first-type packet from a target device seeking to join a wireless network to which the wireless communication device belongs, the first-type packet comprising target device identifying information specific to the target device;

when the first-type packet received from the target device does not include first wireless-connection-method-type information, storing first specific information in memory, the first specific information comprising the target device identifying information;

when the first-type packet received from the target device includes the first wireless-connection-method-type information, not storing the first specific information in the memory;

receiving a second-type packet from a first external device after receiving the first-type packet and before allowing the target device to join the wireless network, the second-type packet comprising first external device identifying information specific to the first external device;

determining whether the received target device identifying information included in the first specific information currently stored in the memory is the same as the received first external device identifying information included in the second-type packet;

when the first specific information is currently stored in the memory, and the second-type packet is received from the first external device, selectively sending a third-type packet to the first external device based on whether the target device identifying information is the same as the first external device identifying information, the third-type packet indicating that the first external device is allowed to join a wireless network; and after sending the third-type packet is sent to the first external device, further sending, to the first external device after the third-type packet is sent, a wireless profile required for the first external device to join the wireless network.

* * * * *